United States Patent
Xiao et al.

(10) Patent No.: US 8,767,393 B2
(45) Date of Patent: Jul. 1, 2014

(54) DRAINING APPARATUS FOR ELECTRONIC DEVICE

(71) Applicants: Hong Fu Jin Precision Industry (ShenZhen) Co., Ltd., Shenzhen (CN); Hon Hai Precision Industry Co., Ltd., New Taipei (TW)

(72) Inventors: Gui-Fu Xiao, Shenzhen (CN); Yang Liu, Shenzhen (CN); Cheng-Fei Weng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/684,245

(22) Filed: Nov. 23, 2012

(65) Prior Publication Data
US 2014/0131184 A1    May 15, 2014

(30) Foreign Application Priority Data
Nov. 15, 2012 (CN) .......................... 2012 1 0459376

(51) Int. Cl.
*G06F 1/16* (2006.01)
*H05K 5/00* (2006.01)
*H05K 7/00* (2006.01)

(52) U.S. Cl.
USPC ................................ 361/679.55; 361/679.08

(58) Field of Classification Search
CPC ........... G06F 1/1632; H01H 2223/003; H01H 2223/004
USPC .......... 361/679.08–679.2, 679.41; 200/302.1, 200/302.2, 306; 400/713, 714
See application file for complete search history.

(56) References Cited

U.S. PATENT DOCUMENTS

| | | | | |
|---|---|---|---|---|
| 4,020,328 | A * | 4/1977 | Bradam | 235/146 |
| 4,471,189 | A * | 9/1984 | Bacon et al. | 200/516 |
| 4,758,712 | A * | 7/1988 | Matone et al. | 235/145 R |
| 5,080,155 | A * | 1/1992 | Crozier | 150/154 |
| 5,421,659 | A * | 6/1995 | Liang | 400/472 |
| 5,681,122 | A * | 10/1997 | Burke | 400/472 |
| 5,944,432 | A * | 8/1999 | Richardson | 400/713 |
| 5,957,831 | A * | 9/1999 | Adair | 600/101 |
| 6,084,769 | A * | 7/2000 | Moore et al. | 361/679.47 |
| 6,156,983 | A * | 12/2000 | Chen et al. | 200/302.1 |
| 6,353,536 | B1 * | 3/2002 | Nakamura et al. | 361/679.41 |
| 6,443,644 | B1 * | 9/2002 | Takeda et al. | 400/490 |
| 6,610,944 | B2 * | 8/2003 | Lee et al. | 200/302.1 |
| 6,660,388 | B2 * | 12/2003 | Liu et al. | 428/421 |
| 6,803,865 | B2 * | 10/2004 | DeLuga | 341/22 |

(Continued)

OTHER PUBLICATIONS http://www.access-is.com/waterproof-keyboard-cover-membrane.php (Jul. 9, 2010).*

*Primary Examiner* — Adrian S Wilson
(74) *Attorney, Agent, or Firm* — Novak Druce Connolly Bove + Quigg LLP

(57) ABSTRACT

A draining apparatus for a keyboard of an electronic device includes a base for slantingly supporting the keyboard and a protecting film to be covered on the keyboard. The protecting film includes a waterproof sheet and a flange protruding up from edges of the waterproof sheet. The flange defines an outfall adjacent to a bottom end of the flange. In case liquid is spilled on the protecting film, the water may flow downward and islet out through the outfall.

7 Claims, 4 Drawing Sheets

(56) References Cited

U.S. PATENT DOCUMENTS

| | | | |
|---|---|---|---|
| 6,887,002 B1* | 5/2005 | Chen | 400/490 |
| 6,962,454 B1* | 11/2005 | Costello | 400/713 |
| 7,031,148 B1* | 4/2006 | Lin | 361/679.08 |
| 7,106,585 B2* | 9/2006 | Lin | 361/679.49 |
| D543,209 S * | 5/2007 | Bae | D14/451 |
| 7,365,967 B2* | 4/2008 | Zheng | 361/679.09 |
| 7,495,895 B2* | 2/2009 | Carnevali | 361/679.26 |
| 7,525,792 B2* | 4/2009 | Yokote | 361/679.02 |
| 7,619,880 B2* | 11/2009 | Liang et al. | 361/679.08 |
| 7,729,106 B2* | 6/2010 | D'Urso et al. | 361/679.01 |
| 7,838,784 B2* | 11/2010 | Arisaka et al. | 200/302.1 |
| 7,983,036 B2* | 7/2011 | Ruch et al. | 361/679.55 |
| D678,890 S * | 3/2013 | Bristol et al. | D14/455 |
| D678,891 S * | 3/2013 | Bristol et al. | D14/455 |
| 2003/0002910 A1* | 1/2003 | Jeffries et al. | 400/714 |
| 2003/0057076 A1* | 3/2003 | Lee et al. | 200/302.1 |
| 2004/0168754 A1* | 9/2004 | Chen | 150/156 |
| 2005/0122678 A1* | 6/2005 | Patel et al. | 361/687 |
| 2005/0224326 A1* | 10/2005 | Oikawa | 200/302.1 |
| 2006/0158844 A1* | 7/2006 | Lee | 361/687 |
| 2007/0115621 A1* | 5/2007 | Guillen | 361/683 |
| 2007/0139873 A1* | 6/2007 | Thomas et al. | 361/681 |
| 2007/0258206 A1* | 11/2007 | Huang | 361/687 |
| 2009/0262492 A1* | 10/2009 | Whitchurch et al. | 361/679.08 |
| 2012/0050077 A1* | 3/2012 | Shih et al. | 341/22 |
| 2012/0050973 A1* | 3/2012 | Sakuma | 361/679.09 |

* cited by examiner

DRAINING APPARATUS FOR ELECTRONIC DEVICE

BACKGROUND

1. Technical Field

The present disclosure relates to an apparatus which drains liquid spilled on an electronic device.

2. Description of Related Art

In the case of liquid being spilled on a keyboard of an electronic device and entering inside the keyboard, the keyboard may become dirty and the circuit board inside the electronic device may even be damaged. Although a protecting film is generally covered on the keyboard for protecting against liquids, water still may enter inside the keyboard from the edges of the protecting film. Thus an apparatus for draining an electronic device is desired in case of spill.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
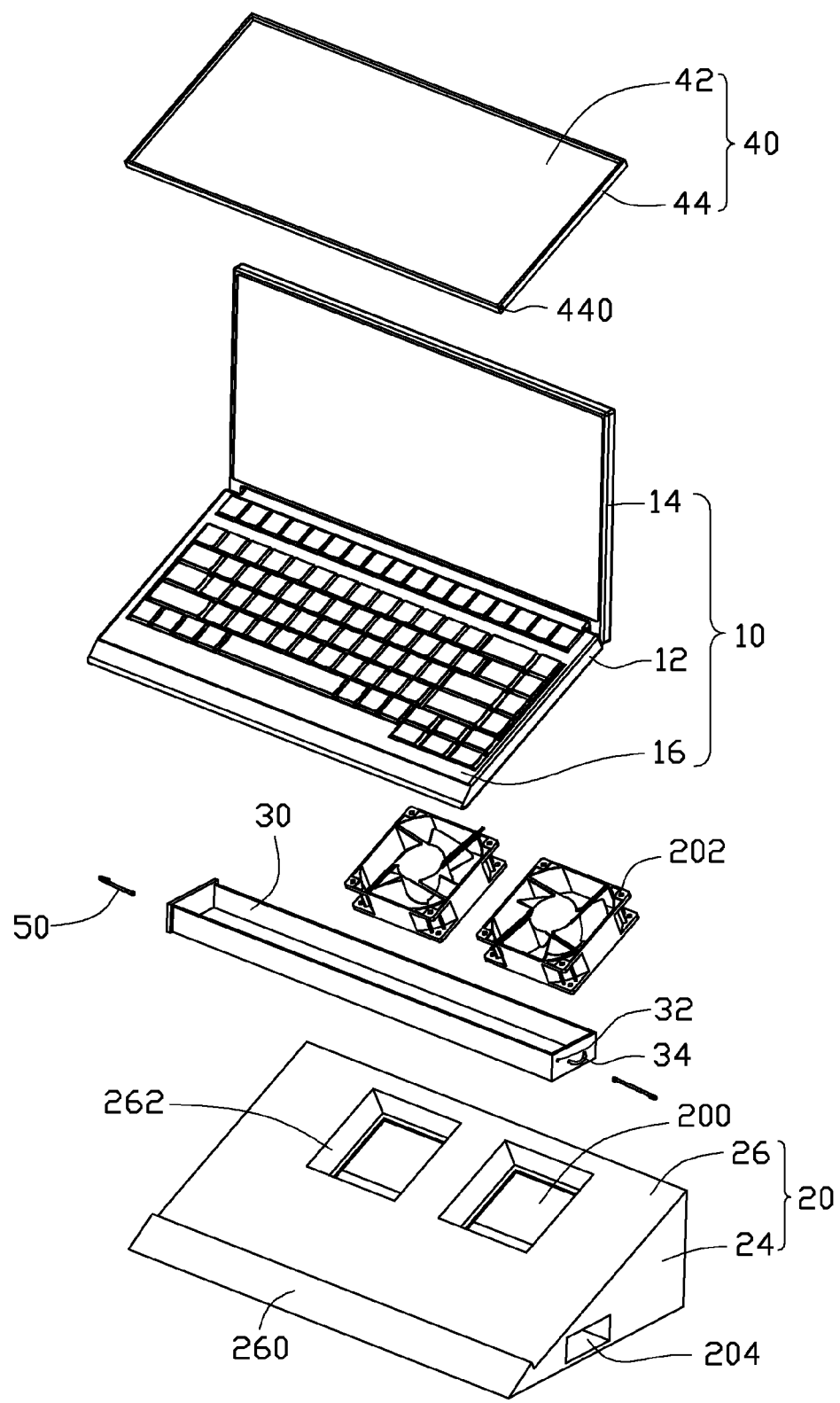
FIG. 1 is an exploded, isometric view of an exemplary embodiment of a draining apparatus including a drainpipe, together with an electronic device.

Referring to FIG. 1, an exemplary embodiment of a draining apparatus is provided to waterproof an electronic device 10. In the embodiment, the electronic device is a notebook computer 10.

The notebook computer 10 includes a main body 12, a display 14 pivotably connected to a side of the main body 12, and a keyboard 16 arranged on a top of the main body 12.

The draining apparatus includes a hollow base 20, a rectangular trough 30, a protecting film 40, and two drainpipes 50.

The base 20 is substantially wedge-shaped, and includes two opposite triangular sidewalls 24 each having a slanted top side, and a slanted top wall 26 connected between the top sides of the sidewalls 24. A receiving space 200 is bounded by the sidewalls 24 and the top wall 26. The base 20 defines an opening 204 extending through the sidewalls 24 and communicating with the receiving space 200. A blocking portion 260 perpendicularly extends up from a bottom side of the top wall 26. The top wall 26 defines two receiving rooms 262 communicating with the receiving space 200 adjacent to a top end of the top wall 26 to respectively receive two fans 202.

The trough 30 defines a receiving space extending through a top surface of the trough 30, and two intakes 32 in opposite end walls of the trough 30. The intakes 32 communicate with the receiving space of the trough 30. A handle 34 is mounted to one of the end walls of the trough 30.

The protecting film 40 is made of waterproof material, and is to be covered on the keyboard 16. The protecting film 40 includes a waterproof sheet 42 and a flange 44 protruding up from the edge of the waterproof sheet 42. The flange 44 defines at least one outfall 440 adjacent to a bottom end of the flange 44 opposite to the display 14. In this embodiment, the waterproof sheet 42 is rectangular, and the flange 44 includes four walls protruding from four sides of the waterproof sheet 42. Two outfalls 440 are defined adjacent to ends of two opposite walls of the flange 44 away from the display 14. In this embodiment, the waterproof sheet 40 is planar. In another embodiment, the waterproof sheet 42 defines a plurality of hollow raised portions to correspondingly receive the keys of the keyboard 16.

Figure 2:
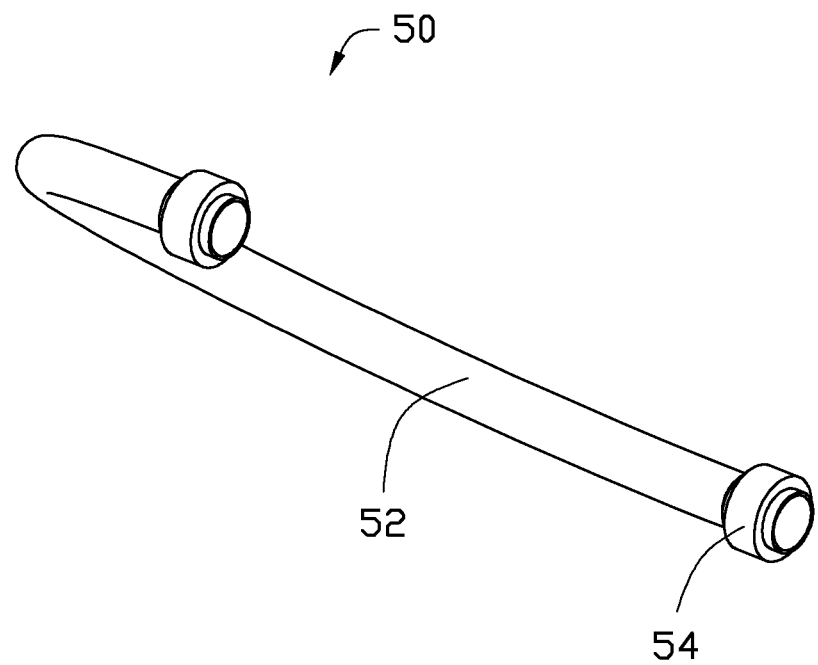
FIG. 2 is an enlarged view of the drainpipe of FIG. 1.

Referring to FIG. 2, each drainpipe 50 includes a hollow tube 52 and two hollow engaging portions 54 connected to opposite ends of the tube 52.

Figure 3:
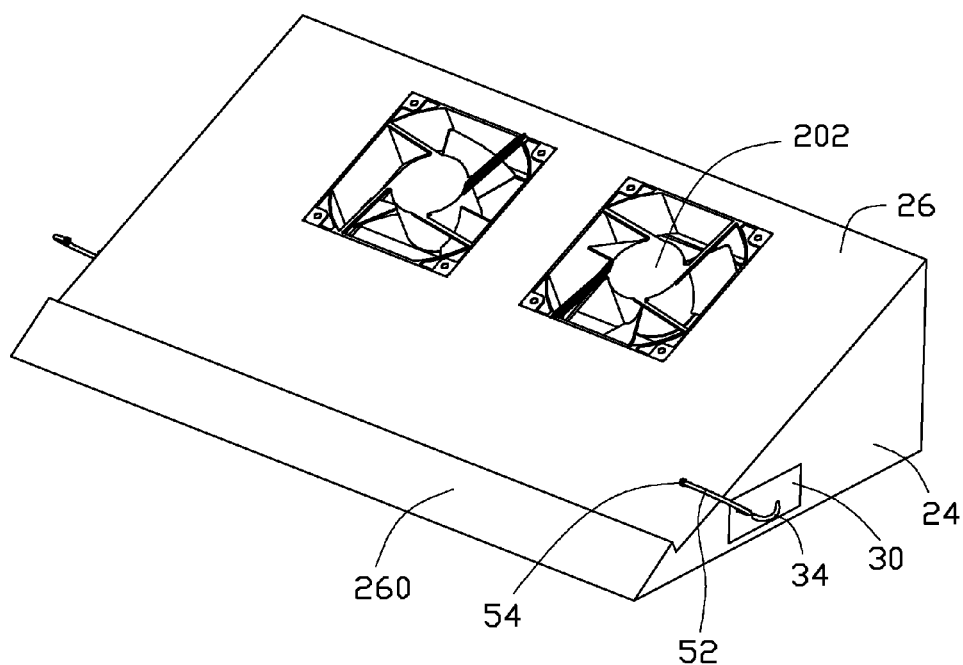
FIG. 3 is a partly assembled view of FIG. 1.
Figure 4:
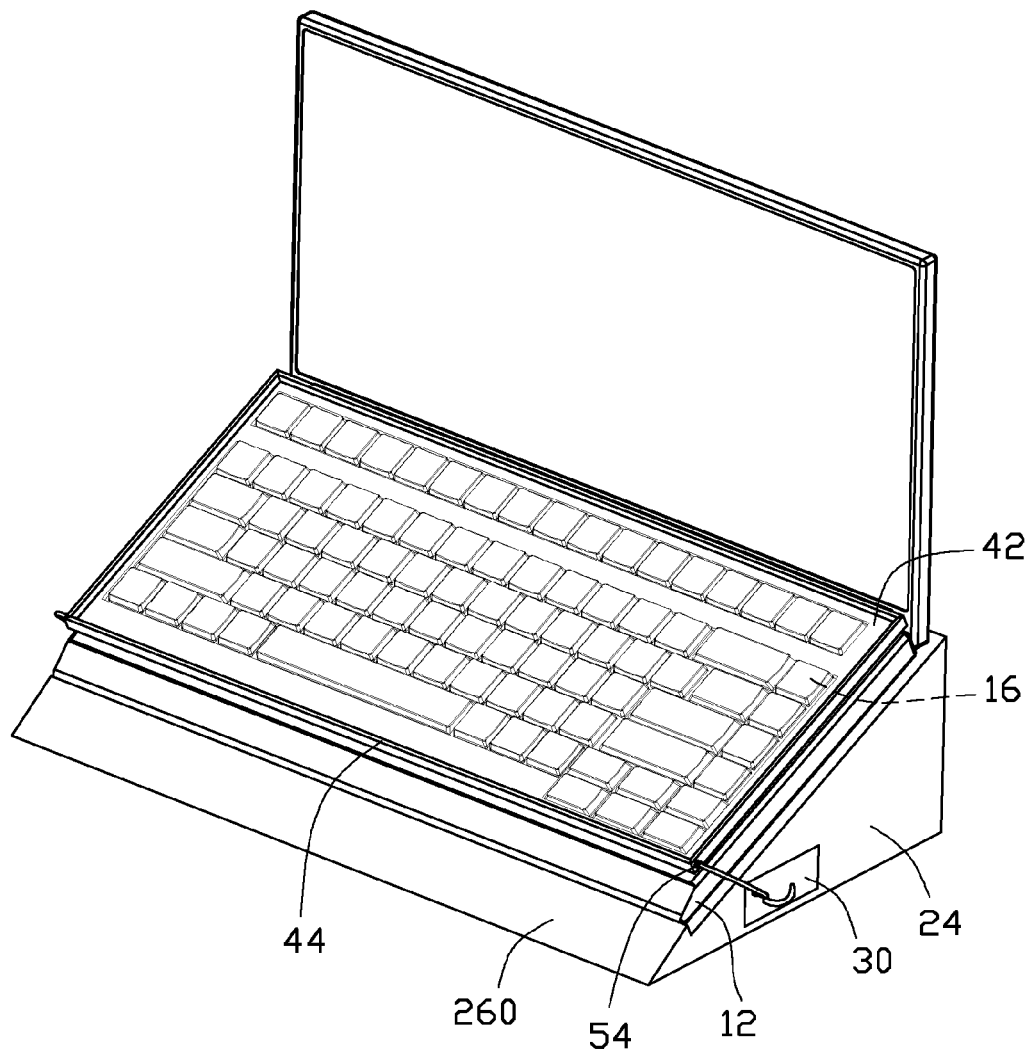
FIG. 4 is an assembled, isometric view of FIG. 1.

The main body 12 is slantingly supported on the top wall 26 and blocked by the blocking portion 260 as shown in FIGS. 3 and 4. The trough 30 is received in the receiving space 200 in front of the fans 202 through an end of the opening 204. The protecting film 40 is covered on the keyboard 16, and the outfalls 440 are adjacent to the blocking portion 260. The engaging portions 54 of each drainpipe 50 are respectively engaged in one of the outfalls 440 and an adjacent intake 32.

Because the protecting film 40 is covered on the keyboard 16, liquid cannot enter inside the main body 12 through the keyboard 16. Because the main body 12 is slantingly supported on the base 20, in case liquid is spilled on the waterproof sheet 42, the liquid may flow downward and is let out through the outfalls 440, the drainpipes 50, and the intakes 32. In case the trough 30 is fully filled, one of the handles 34 can be operated to pull the trough 30 out of the receiving space 200 through an end of the opening 204. The fans 202 are located below the main body 12 to dissipate heat for the electronic device 10.

It is believed that the present embodiments and their advantages will be understood from the foregoing description, and various changes may be made thereto without departing from the spirit and scope of the description or sacrificing all of their material advantages, the examples hereinbefore described merely being exemplary embodiments.

What is claimed is:

1. A draining apparatus for an electronic device comprising a keyboard, the draining apparatus comprising:
   a base for slantingly supporting the keyboard;
   a protecting film comprising a waterproof sheet to be covered on the keyboard and a flange protruding from edges of the waterproof sheet, the flange defines an outfall; wherein when liquid is spilled on the protecting film, it flows downward and is let out through the outfall; and
   a draining pipe, wherein the draining pipe comprises a first end connected to the outfall of the protecting film.

2. The draining apparatus of claim 1, wherein the base comprises two opposite sidewalls each have a slanted top side, and a top wall connected between the top sides of the sidewalls to slantingly support the keyboard of the electronic device, a blocking portion protrudes up from a bottom side of the top wall to block the keyboard.

3. The draining apparatus of claim 2, wherein the top wall defines a receiving room to receive a fan.

4. The draining apparatus of claim 2, wherein the waterproof sheet is rectangular, the flange protrudes from four edges of the waterproof sheet, the outfall is defined in the flange adjacent to the blocking portion.

5. The draining apparatus of claim 1, further comprising a trough connected to a second end of the draining pipe opposite to the first end, for receiving liquid.

6. The draining apparatus of claim 5, wherein a receiving space is bounded by the sidewalls and the top wall to receive the trough.

7. The draining apparatus of claim 6, wherein the trough defines an intake, the draining pipe comprises two hollow engaging portions at the first and second ends to engage in the corresponding outfall and intake.

* * * * *